US008311935B2

(12) United States Patent
Balachandran et al.

(10) Patent No.: US 8,311,935 B2
(45) Date of Patent: Nov. 13, 2012

(54) DAYLIGHT OVERDRAFT TRACKING

(75) Inventors: Thangam Balachandran, Mineral Wells, TX (US); Mary H. Wark, Richmond, VA (US); Amos Radford, Pittsburg, CA (US); Sandra Svoboda, Concord, CA (US); Natalie Fox, Walnut Creek, CA (US); Gregory Cotton, Antioch, CA (US); Robert B. Clark, Indian Trail, NC (US); Samuel Clerico, Highland Mills, NY (US); Patricia L. Lees, Sonoma, CA (US); Jurado L. Perlas, South San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 334 days.

(21) Appl. No.: 11/933,341

(22) Filed: Oct. 31, 2007

(65) Prior Publication Data

US 2009/0024496 A1 Jan. 22, 2009

Related U.S. Application Data

(60) Provisional application No. 60/950,274, filed on Jul. 17, 2007.

(51) Int. Cl.
*G06Q 40/00* (2012.01)
(52) U.S. Cl. .......................................................... 705/38
(58) Field of Classification Search ................ 705/1, 38, 705/1.1
See application file for complete search history.

(56) References Cited

U.S. PATENT DOCUMENTS

| | | | |
|---|---|---|---|
| 5,649,116 A * | 7/1997 | McCoy et al. .................. 705/38 |
| 5,671,412 A * | 9/1997 | Christiano ................. 707/104.1 |
| 2005/0080736 A1 * | 4/2005 | Dent et al. ...................... 705/40 |
| 2006/0059085 A1 * | 3/2006 | Tucker ............................. 705/38 |
| 2007/0192238 A1 * | 8/2007 | Shata et al. ..................... 705/38 |
| 2007/0203827 A1 * | 8/2007 | Simpson et al. ................. 705/38 |
| 2008/0021813 A1 * | 1/2008 | Simpson et al. ................. 705/38 |
| 2009/0094156 A1 * | 4/2009 | Wright et al. ................... 705/40 |

OTHER PUBLICATIONS

Olson, Betsy, and Schmidt, Larry. "Fed starts charging banks: Surviving the effects of the new daylight overdraft squeeze." Corporate Cashflow Apr. 1, 1994: ABI/Inform Global, ProQuest. Web. Jun. 18, 2012.*
FedLine Web/FedLine Advantage Account Management Information/Daylight Overdraft Reports Release 4.0 User Guide, 101 pages, available at least as early as Jul. 11, 2007.

* cited by examiner

*Primary Examiner* — Seye Iwarere
(74) *Attorney, Agent, or Firm* — Banner & Witcoff, Ltd.; Michael A. Springs

(57) ABSTRACT

Techniques and systems are disclosed for calculating daylight negative balance fees charged to a user associated with a plurality of deposit account. The daylight negative balance fees may be customized (or adjusted) to the amount of time the user's aggregate accounts maintained a negative balance. As such, those users that spend more time with a negative balance during a business day may be charged higher fees than other users. Moreover, multiple deposit platforms may provide account data through feeds. As such a user with multiple accounts may be charged according to its aggregate negative balance amount rather than simply on each account individually. Additionally, enhanced reporting and billing features are disclosed.

21 Claims, 3 Drawing Sheets

DAYLIGHT OVERDRAFT TRACKING

This application claims priority from U.S. Provisional Patent Application Ser. No. 60/950,274, filed Jul. 17, 2007. The aforementioned provisional application is hereby incorporated by reference in its entirety.

BACKGROUND

The Federal Reserve System controls the use of intraday Federal Reserve Credit. During the business day the balance in a banking institution's master account may become negative. The Federal Reserve developed a Reporting and Pricing System to monitor the institution's negative balance activity and to calculate negative balance charges. The reporting and pricing system captures all debits and credits resulting from the banking institution's payment activity and calculates end-of-minute account balances using the daylight negative balance posting rules. The Reporting and Pricing system generates reports at the end of each day and at the end of each two-week reserve maintenance period. Daily reports are used by Reserve Bank monitoring staff and by some banking institutions. The two-week reports show relevant monitoring information such as peak daily negative balances for the period, negative balances in excess of net debit cap, book-entry negative balances, non-Fedwire account activity, end-of-minute account balances for a particular day, and related ratios, such as the peak daily negative balance relative to net debit cap. Reserve Banks may use the reporting and pricing system reports to assess daylight negative balance charges against a banking institution.

The reporting and pricing system provides real-time access to intra-day account balance and daylight negative balance information for master account holders and subaccount holders. It also provides available funds balance information for master account holders (e.g., users). The reporting and pricing system gives banking institutions the ability to point and click in order to drill-down from a summary total to an individual transaction, as well as search for a specific entry or group of entries. In addition, the application provides statement of account information to assist with account reconcilement functions. Master account holders can view activity for their own account, subaccounts, respondents, and affiliates, with appropriate authorization. Subaccount holders can view a sub-set of activity for their own account, respondents, and affiliates, if authorized. Subaccount holders can also view activity in the master account, if authorized. The Federal Reserve also provides other systems, such as the Account Management Information application and Cash Management Services to assist account holders. These and other features of the reporting and pricing system is described in a user guide made available by the Federal Reserve.

BRIEF SUMMARY

Aspects of the present disclosure address one or more of the issues mentioned above by disclosing systems, devices, and methods. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In accordance with various aspects of the disclosure, a method is disclosed for calculating daylight negative balance fees charged to a user associated with a plurality of deposit account. The method includes receiving data from a plurality of deposit platforms. The data received may comprise a deposit account amount, a corresponding time, and a unique identifier associated with the deposit account. The method may also include aggregating the deposit account amounts according to the unique identifier. Furthermore, the method allows for calculating a daylight negative balance charge for the deposit accounts associated with the unique identifier on a predetermined interval (e.g., one minute intervals). In some examples, a billing statement for the user designated for the unique identifier may be generated and/or displayed through a web interface.

In one example, a system in accordance with aspects of the disclosure may comprise a computing device with at least a communication connection, a memory, and a processor. The processor may be used to perform one or more steps for tracking daylight negative balances. In another example, a computer-readable storage medium comprising computer-executable instructions for causing a processor to perform a method of tracking daylight negative balance is disclosed. The instructions may include steps for performing one of any methods disclosed herein or known to one of skill in the art in tracking daylight negative balances.

Various systems and persons involved in the banking process may benefit from one or more aspects of the embodiments disclosed herein. The features of the illustrative embodiments described herein contemplate additional other embodiments comprising one or more, or a combination thereof, of the aspects described throughout.

BRIEF DESCRIPTION OF THE DRAWINGS

The present disclosure is illustrated by way of example and not limited in the accompanying figures in which like reference numerals indicate similar elements and in which.

DETAILED DESCRIPTION

Prior to the present system for daylight negative balance tracking, large commercial customers with Negative balance Limits in place typically incurred negative balances in their accounts throughout the day and would fund their accounts towards the end of the business day. Some customers paid a negotiated flat fee for daylight negative balance privileges because of the inability to capture a particular customer's minute by minute negative balances. Thus there was an inability to easily customize intraday fees to those customers that have incurred a negative balance for more time and/or amounts than other customers.

Figure 2:
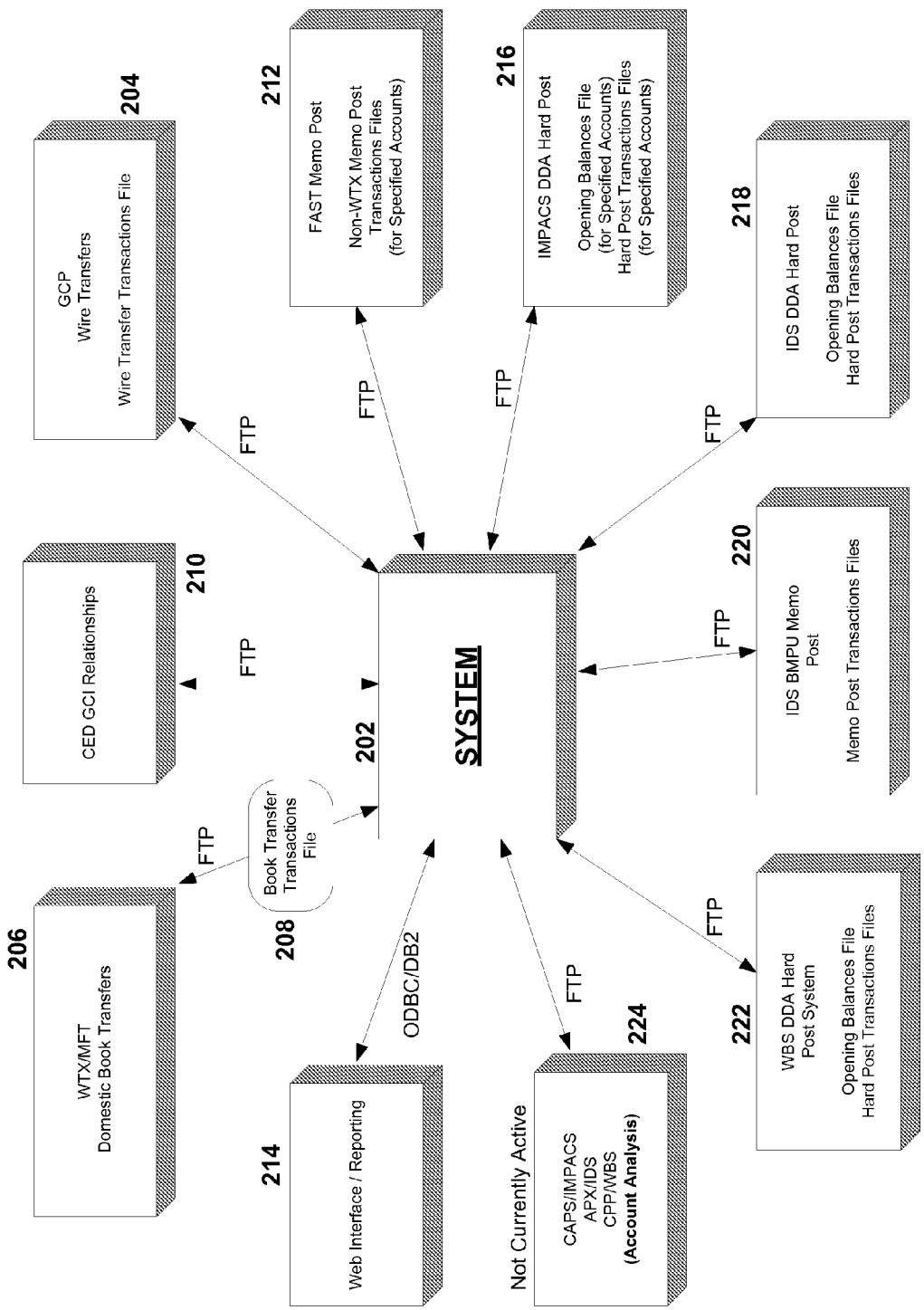
FIG. 2 shows an illustrative block diagram in accordance with various aspects of the invention.

The present system, unlike the Federal Reserve's Reporting and Pricing System, monitors negative balance activity at a customer account level and not at an ABA routing number level. In addition, the present system analyzes a large amount of deposits/withdrawals and other account activity to determine the negative balance amounts and times. Therefore, in one example, the present invention performs its calculations ex post. For example, the present system may capture account activity (e.g., DDA transaction activity) for a full day and then use that information to retroactively calculate the negative balance amount and times. The present system may, as shown in FIG. 2, pull account activity from numerous deposit platforms. Furthermore, the present system may provide reports/invoices on a monthly (or any other periodic) basis.

In addition, in one example, the present system may be configured to provide a customer with the benefit of the doubt in negative balance fee calculations. For example, if there is any question concerning the timing of the data all credits may be posted before debits. The system may credit the customer when a possible point of confusion may arise. For example, if a customer believes it deposited money at a particular time, but the present system captures the account transaction with a slightly later timestamp, the system may give the customer the benefit of the doubt. Therefore, in some instances, the aggregate negative balance fees received from customers may be less than the negative balance fees charged by the Federal Reserve.

Furthermore, the present system may associate accounts and activity by a GCI family structure, while the Federal Reserve reporting and pricing system may use an ABA structure using master accounts and subaccounts. GCI (Global Customer Identifier) may be a multi-digit code to track parties of the Global Corporate and Investment Bank (GCIB), Global Business and Financial Services (GB&FS). GCI records may also contain various attributes about the client, as well as the line-of-business team members and their role responsibilities to their respective clients. GCIs may be assigned by a Core Entity Database (CED) that maintains profiles, and the like, for the various customers/entities.

Additionally, the present system may provide for special handling of ACH activity by, for example, processing such activity at only predetermined time(s) during a day (e.g., 8:30 and 11:30). Moreover, the present system may maintain the history of a customer and be able to provide that as an archive at a later time.

Figure 1:
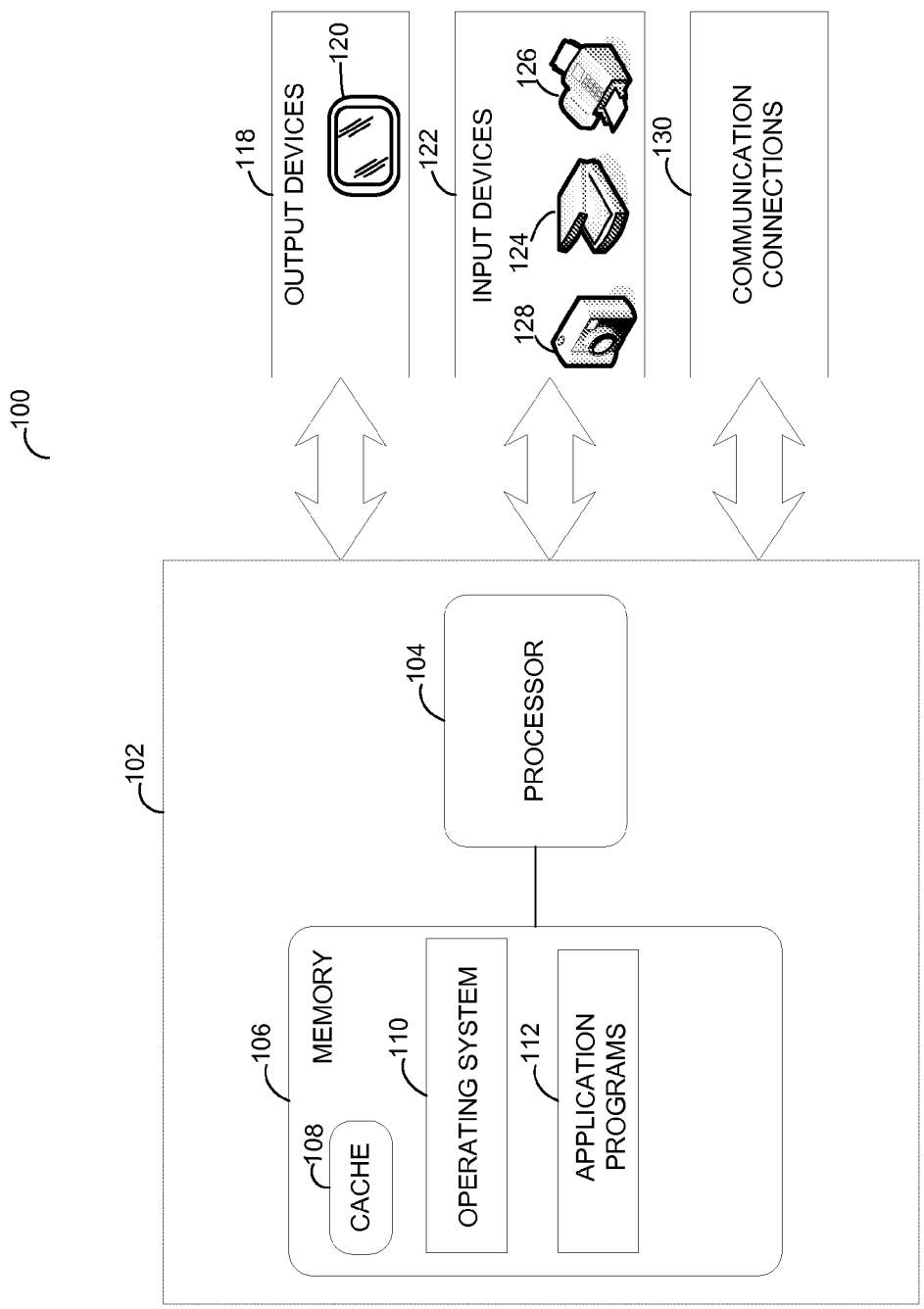
FIG. 1 shows an illustrative operating environment in which various aspects of the disclosure may be implemented.

An example of an illustrative personal computing system 100 in which various aspects and embodiments of the invention may be implemented is show in the simplified diagram in FIG. 1. The features of such a device are well-known to those of skill in the art and need not be described at length here. The illustrative system 100 is only one example of a suitable system and is not intended to suggest any limitation as to the scope of use or functionality of the invention. Suitable computing environments for use with the invention include a computing device 102 or system that support interaction with an input devices 122 (e.g., digital camera 128, document scanner 124, multi-function office device 126, and the like.), output devices 118 (e.g., visual display 120), and communication connections 130 (e.g., Ethernet connection, IEEE 802.11, dial-up connection, and the like). The communication connections 130 may be used to allow the computing device 102 to communicate with other devices. With reference to FIG. 1, a computing device 102 commonly includes a memory 106 and a processor 104.

Programs, comprising sets of instructions and associated data, may be stored in the memory 106, from which they can be retrieved and executed by the processing unit 103. Among the programs and program modules stored in the memory 106 are those that comprise or are associated with an operating system 110 as well as application programs 112. Application programs 112, such as a web browser application, Java runtime environment, and others, and an operating system 110 are commonly installed in a computing device 102. The memory 106 may also include a cache 106 to enhance device performance. Computing system 100 includes forms of computer-readable media. Computer-readable media include any available media that can be accessed by the computing device 102. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

One skilled in the art will appreciate that numerous servers and/or computing devices may be used in the implementation of the various aspects of the disclosure. For example, a database may be used to maintain account and/or user information. In addition, data files may be stored on computer-readable medium and transported in various ways (e.g., via internet, wirelessly, wired, secure VPN, SSL, and the like) among the various devices. In addition, computer-executable instructions may be stored on computer-readable medium to perform one or more of the steps disclosed herein. A processor and/or memory, along with a user interface may be provided to interact with the various aspects of the system.

FIG. 2 depicts a simplified, illustrative diagram of communications among various entities, persons, and/or systems in accordance with aspects of the disclosure. The illustrative diagram in FIG. 2 is only one example of a suitable communication scenario and is not intended to suggest any limitation as to the scope of use or functionality of the disclosure.

System 202 may be a computing system 100 that provides the capability of capturing an account's or family of account's one-minute balances. This allows system 202 to calculate fee charges for those accounts with a negative balance based on actual number of minutes throughout the Fed Operating Day multiplied by an agreed upon a predetermined rate. In one example, the predetermined fee rate may be a different variable rate that varies according to the type of user holding the account. For example, a large business account may be provided a lower predetermined rate than an individual personal account.

As illustrated in FIG. 2, system 202 receives some feeds from various systems including wire transfer feeds from Global Cash Position (GCP) 204, a proprietary system of Corporate Treasury. One skilled in the art will appreciate that there are various techniques that may be used to transmit a feed of data, including but not limited to, file transfer protocol (FTP), ODBC/DB2, and others.

In one example, system 202 receives a feed from a wire/money transfer payment system (e.g., WTX/MFT Domestic Book Transfers 206). The feed may include a book transfer transactions file 208. The payment system may be transferred on a daily basis, or any other predetermined interval. In addition, system 202 may receive a feed from a database 210 maintaining account relationships (e.g., GCI relationships). A Global Corporate/Customer/Client Identifier (GCI) may include a multi-digit code (e.g., nine-digit code) assigned by a Core Entity Database (CED) to track parties of the Global Corporate and Investment Bank (GCIB), Global Business and Financial Services (GB&FS). GCI records on CED also contain various attributes about the client, as well as the line-of-business team members and their role responsibilities to their respective clients. The Core Entity Database (CED) may be the current database of record for all customer and prospect identification for the select service level, including Global Corporate & Investment Banking (GCIB), Global Business and Financial Services (GBFS), Corporate Real Estate, and Private Bank. This database may contain party-to-party, customer-to-account, and party-to-associate references.

For example, corporation #1 may have three wholly-owned subsidiaries and have a GCI number associated with it. When requesting information using corporation #1 GCI number, system 202 may provide a comprehensive listing of each wholly-owned subsidiaries negative balance amounts and times. Meanwhile, system 202 may also provide information about the wholly-owned subsidiaries (or any other type of affiliated corporation or entity or person) on an individual basis.

Furthermore, system 202 may receive a feed from the GCP (global cash positioning) system 204 to facilitate the calculation of the cost of intraday liquidity usage. In addition, FAST memo post 212 feeds may be used to submit information to system 202 about manually entered deposit amounts and times. Moreover, various deposit platforms (216, 218, 220, 222, 224) are illustrated in FIG. 2. These platforms may submit feeds to system 202 for processing and use in calculating negative balance amounts and times for numerous deposit accounts, which are uniquely identified by a GCI. The times provided by such platforms may be represented, in one example, as the duration of time that a corresponding deposit account maintained a negative balance. In another example, the times provide may be a start time and stop time marking the time a corresponding deposit account maintained a negative balance.

In addition, a web interface 214 may be provided as an enhancement to allow customers to view their daylight negative balance tracking reports on-line. The web interface 214 may also permit the customer to interact with a financial institution to provide feedback and/or questions/comments regarding items in their daylight negative balance tracking report. For example, a customer may submit an inquiry as to a particular charge via the online interface. One skilled in the art will appreciate that various web technologies, such as a web browser, may be used to create such an interface. For example, the system 202 may comprise a processor 104 and memory 106 (e.g., a database server) to store and process information from feeds.

Figure 3:
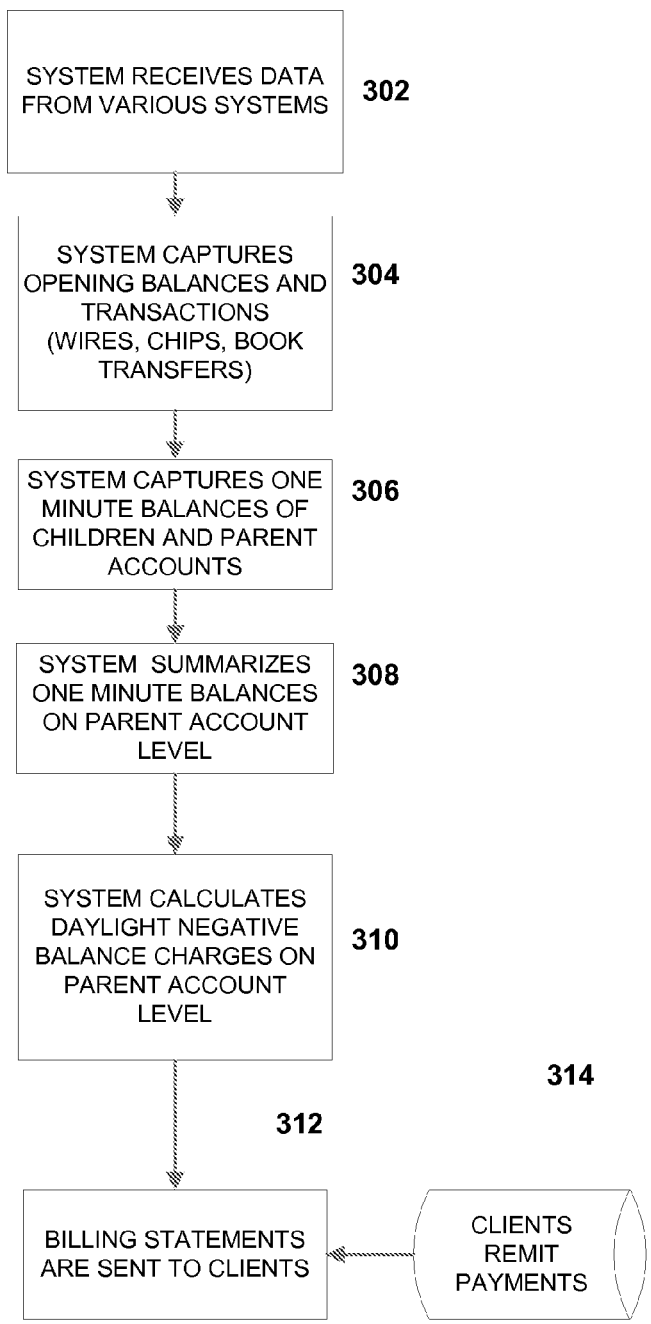
FIG. 3 illustrates a method in which various aspects of the disclosure may be implemented.

Referring to FIG. 3, system 202 receives information (in step 302) from various sources as illustrated in FIG. 2. This information may include data comprising deposit account amounts, the time when the deposit account amount was captured, and the GCI (i.e., unique identifier) for the account. System 202 may capture (in step 304) a customer's aggregate balance at the start of a business day. For example, referring to the earlier example involving corporation #1, the corporation's aggregate balance would be the sum of each individual subsidiary's deposit account balance at the start of the day. Furthermore, system 202 may continue to capture data (in step 306) about the deposit accounts on a predetermined interval (e.g., one-minute intervals). System 202 may use the captured information throughout the day to summarize minute by minute balances (in step 308) for the customer (and any children companies associated with the customer).

In accordance with various aspects of the disclosure, using a predetermined formula, system 202 may calculate (in step 310) the intraday negative balance fees due to the customer. This predetermined formula may be based on the Federal Reserve Bank's intraday negative balance computation. System 202 may use various systems, including CHIPS (clearinghouse for international payments systems) to calculate such fees. Furthermore, the calculation (in step 310) of the daylight negative balance charge may contain adjustments based on the user's use of financial services (e.g., business checking accounts, certificate of deposits, credit card services, and the like) offered by a financial institution. In another example, such adjustments may be based on the user maintaining a minimum balance in an account after the close of business each day (i.e., overnight). In addition, system 202 may group a customer and related accounts together or into different groups as desired. In one example, at regular intervals (e.g., monthly), a billing statement may be generated (in step 312) and sent to the customer for remittance (see step 314). The billing statement may comprise an individual summary of the minute-by-minute account balances of all deposit accounts associated with a particular unique identifier of a user. Alternatively, the billing statement may include just a summary of the aggregate account balance of all deposit accounts associated with the particular unique identifier.

The present system, in accordance with various aspects of the disclosure may provide one or more of the following features: (1) capture of minute by minute balances; (2) summarizing these one minute balances on a parent account level; and (3) calculation of daylight negative balance charges on a parent account level. Aspects of the disclosure provide a competitive advantage in terms of an ability to charge account holders a fee for the use of intraday credit. Intraday negative balance fees have increased significantly and the present system permits a recouping of some of these charges by creating a system that captures an account holder's one minute balances and mimics (i.e., enhances upon the basic technique of) the Fed's intraday negative balance fee calculation.

Although not required, one of ordinary skill in the art will appreciate that various aspects described herein may be embodied as a method, a data processing system, or as a computer-readable medium storing computer-executable instructions. For example, a computer-readable medium storing instructions to cause a processor in a computing device to perform steps of a method in accordance with aspects of the disclosure is contemplated. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Furthermore, the features of the embodiments described above contemplate other embodiments comprising one or more, or a combination thereof, of the aspects described throughout.

We claim:

1. A computer assisted method of calculating daylight negative balance fees charged to a user associated with a plurality of deposit accounts, comprising:

electronically receiving, at a computer, data from a plurality of deposit platforms, the data comprising a deposit account amount, a corresponding time, and a unique identifier associated with the deposit account, where the unique identifier is not a routing number;

aggregating, at the computer, the deposit account amounts according to the unique identifier associated with each deposit account; and calculating, at the computer, a daylight negative balance fee for the deposit accounts associated with the unique identifier on a predetermined interval, wherein calculating the daylight negative balance fee is based on an actual number of minutes the aggregate deposit accounts associated with the unique identifier have a negative balance, wherein the daylight negative balance fee is adjusted in the user's favor when a dispute arises concerning the timing of posting of credits and debits to a deposit account.

2. The method of claim 1, further comprising: generating, at the computer, a billing statement for the user designated for the unique identifier.

3. The method of claim 2, further comprising: displaying, at the computer, the billing statement to a user through a web interface.

4. The method of claim 2, where the billing statement comprises an individual summary of one minute account balances of all deposit accounts associated with the unique identifier.

5. The method of claim 2, where the unique identifier is a global customer identifier.

6. The method of claim 1, further comprising: storing in memory, at the computer, a history of the deposit account amounts and daylight negative balance fees.

7. The method of claim 1, where calculating the daylight negative balance fee is based on an actual number of minutes the aggregate deposit accounts associated with the unique identifier have a negative balance multiplied by a predetermined fee rate.

8. The method of claim 7, where the predetermined fee rate is a variable rate that varies according to the type of user.

9. A computer-readable storage medium storing computer-executable instructions that cause a processor to perform a method of calculating daylight negative balance fees charged to a user associated with a plurality of deposit accounts, comprising:
  receiving data from a plurality of deposit platforms, the data comprising a deposit account amount, a corresponding time, and a unique identifier associated with the deposit account;
  aggregating the deposit account amounts according to the unique identifier associated with each deposit account;
  calculating a daylight negative balance fee for the deposit accounts associated with the unique identifier on a predetermined interval; and
  displaying a billing statement to a user through a web interface, the billing statement comprising a summary of an aggregate account balance of all deposit accounts associated with the unique identifier,
  wherein calculating the daylight negative balance fee is based on an actual number of minutes the aggregate deposit accounts associated with the unique identifier have a negative balance,
  wherein the daylight negative balance fee is adjusted in the user's favor when a dispute arises concerning the timing of posting of credits and debits to a deposit account.

10. The computer-readable storage medium of claim 9, further comprising: storing in memory a history of the deposit account amounts and daylight negative balance fees.

11. The computer-readable storage medium of claim 9, where calculating the daylight negative balance fee is based on an actual number of minutes the aggregate deposit accounts associated with the unique identifier have a negative balance multiplied by a predetermined fee rate.

12. The computer-readable storage medium of claim 11, where the predetermined fee rate varies according to the type of user.

13. An apparatus, comprising:
  a communication connection configured to receive data from a plurality of deposit platforms, the data comprising a deposit account amount, a corresponding time, and a unique identifier associated with the deposit account, where the unique identifier is not a routing number;
  a memory configured to store the data received from the plurality of deposit platforms, the memory comprising non-volatile memory for storing computer-executable instructions; and
  a processor configured to execute the computer-executable instructions to perform a method comprising:
    receiving the data from the plurality of deposit platforms;
    aggregating the deposit account amounts according to the unique identifier associated with each deposit account;
    calculating a daylight negative balance fee for the deposit accounts associated with the unique identifier on a predetermined interval;
    generating a billing statement for a user designated for the unique identifier,
  wherein calculating the daylight negative balance fee is based on an actual number of minutes the aggregate deposit accounts associated with the unique identifier have a negative balance,
  wherein the daylight negative balance fee is reduced when the user maintains at least a predetermined minimum balance in an account after close of business each day.

14. The apparatus of claim 13, where the predetermined interval is approximately one minute.

15. The apparatus of claim 13, where calculating the daylight negative balance fee is based on an actual number of minutes the aggregate deposit accounts associated with the unique identifier had a negative balance multiplied by a predetermined fee rate.

16. The apparatus of claim 15, where the predetermined fee rate varies according to the type of user.

17. The apparatus of claim 13, where calculating the daylight negative balance fee includes adjusting the daylight negative balance fee based on the user's use of financial services offered by a financial institution.

18. The apparatus of claim 13, where receiving the data from the plurality of deposit platforms occurs at approximately one minute intervals.

19. The method of claim 1, wherein the daylight negative balance fee is reduced when the user maintains at least a predetermined minimum balance in an account after close of business each day.

20. The computer-readable storage medium of claim 9, wherein the daylight negative balance fee is reduced when the user maintains at least a predetermined minimum balance in an account after close of business each day.

21. The method of claim 1, wherein calculating the daylight negative balance fee includes adjusting the daylight negative balance fee based on the user's use of financial services offered by a financial institution, including at least one of: checking accounts certificate of deposits or credit card services.

* * * * *